United States Patent Office 2,847,660
Patented Aug. 12, 1958

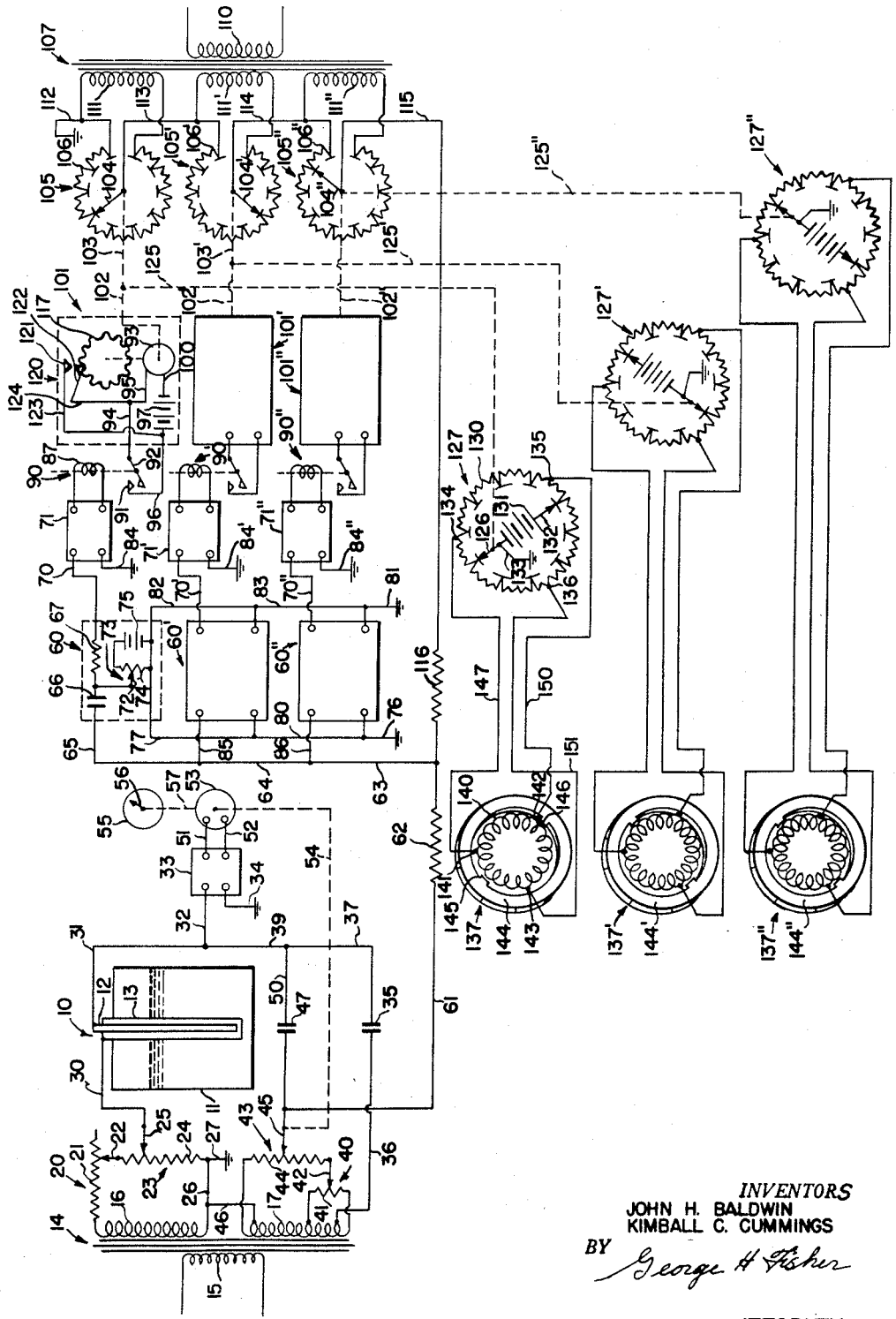

2,847,660

SERVO APPARATUS

John H. Baldwin, Minneapolis, and Kimball C. Cummings, Golden Valley, Minn., assignors to Minneapolis-Honeywell Regulator Company, Minneapolis, Minn., a corporation of Delaware Application October 2, 1953, Serial No. 383,906

6 Claims. (Cl. 340—187)

This invention is concerned with apparatus for indicating the amount of a substance and particularly with digitally indicating apparatus. It is therefore an object of this invention to devise new and improved apparatus for digitally indicating the amount of a substance.

All of the digital type of indicators known to the present inventors make use of gear trains which produce errors due to backlash and which, because of the torque necessary to turn the gear train due to the high gear ratios, are necessarily limited in their speed of response.

It is therefore another object of this invention to devise indicator apparatus for indicating the quantity of a substance which has a high degree of accuracy and eliminates the errors inherent in the use of gear trains.

A further object of the invention is to devise indicator apparatus capable of a very high speed of response in following any sudden, large changes in the amount of the substance being measured.

A still further object of the invention is to devise digital indicator apparatus in which complete revolutions of the lower valued digit wheels are not necessary for rotation of the higher valued digit wheels.

The invention comprises the use of a number of magnetically actuated digit wheels each operated by a potentiometer the wiper arm of which is driven by a motor. The motors are energized upon operation of amplifiers, each of which is affected by different magnitudes of the single input signal. That is, a comparatively small magnitude of signal voltage will cause operation of the first amplifier while a larger magnitude of signal voltage is necessary to operate the second amplifier, a still larger magnitude of signal voltage is necessary to operate the third amplifier and so on. A feedback circuit is also provided with the magnitudes of various portions of the total feedback voltage being dependent upon operation of the various motors. Each motor, in addition to operating upon a transmitter potentiometer also drives a wiper arm on a potentiometer for generating a voltage of a magnitude necessary to neutralize that portion of the signal voltage which results in operation of that motor.

For a more detailed description of the invention reference is had to the following discussion taken in conjunction with the accompanying drawing in which the single figure is a schematic diagram showing apparatus utilizing the invention.

A tank unit 10 is positioned in a tank 11 such that the tank unit extends from the top to the bottom of the tank. The tank unit 10 is a capacitive type tank unit having an inner electrode 12 and an outer electrode 13. The tank 11 is shown to be rectangular in shape though it is realized that most aircraft fuel tanks are not symmetrical due to the necessity for placing the fuel tanks wherever possible in the aircraft. With a non-rectangular fuel tank the capacitive tank unit 10 could be of the type shown in the Condon Patent No. 2,648,982, or in the Meyers Patent Number 2,741,124, both patents being assigned to the same assignee as the present invention.

The source of power for deriving a signal from the tank unit 10 is a transformer 14 having a primary winding 15 connected to a source of power, not shown, and a pair of transformer secondary windings 16 and 17.

A rheostat 20 having a resistor 21 and a wiper arm 22 has one terminal of the resistor connected to the upper terminal of transformer secondary winding 16. A potentiometer 23 having a resistor 24 and a wiper arm 25 has one terminal of the resistor connected to the wiper arm 22 of rheostat 20. The other terminal of potentiometer resistor 24 is connected by conductor 26 to the lower terminal of transformer secondary winding 16, and also to ground terminal 27.

The outer electrode 13 of tank unit 10 is connected by conductor 30 to the wiper arm 25 of potentiometer 23. The inner electrode 12 of tank unit 10 is connected by conductors 31 and 32 to one of the input terminals of an amplifier 33. The other input terminal of amplifier 33 is connected to a ground terminal 34. A capacitor 35 has one of its plates connected by a conductor 36 to a point on transformer secondary winding 17 near its lower terminal. The other plate of capacitor 35 is connected by conductors 37, 39 and 32 to the ungrounded input terminal of amplifier 33.

It is well recognized that the capacitance of tank unit 10 will vary with rise and fall of fuel in the tank 11 because of the difference in dielectric constant between air and fuel, the dielectric constant of air being unity while the dielectric constant of fuel is approximately 2. This means that the capacitance of tank unit 10 will increase from a minimum value when the tank is empty to a capacitance approximately twice its minimum value when the tank is full. Thus, the capacitance of tank unit 10 may be considered to have two components, a fixed component which would be its minimum value when the tank is empty and a variable component which would be the additional capacitance due to fuel in the tank. Capacitor 35 is so chosen that the signal from capacitor 35 due to its capacitance and the voltage across the capacitor is equal to the minimum signal from tank unit 10. As a result, the remaining effective signal from tank unit 10 is the variable signal which is due to fuel in the tank.

A potentiometer 40 having a resistor 41 and a wiper arm 42 has the resistor connected across the lower end of transformer secondary winding 17. A potentiometer 43 having a resistor 44 and a wiper arm 45 has one terminal of the resistor 44 connected to the wiper arm 42 of potentiometer 40 while the other terminal of resistor 44 is connected to the upper terminal of transformer secondary winding 17.

A point near the upper end of transformer secondary winding 17 is connected to ground terminal 27 by conductors 46 and 26.

A capacitor 47 has one of its electrodes connected to potentiometer wiper arm 45 while the other electrode is connected by conductors 50, 39 and 32 to the ungrounded input terminal of amplifier 33.

Amplifier 33 is connected by conductors 51 and 52 to a motor 53 for reversible operation of the motor. The amplifier and motor combination may be of the type shown and described in the Upton Patent No. 2,423,534, assigned to the same assignee as the present invention.

The motor 53 is connected by mechanical connection 54 to the wiper arm 45 of potentiometer 43 for rebalancing purposes. The lower terminal of transformer secondary winding 16 and a point near the upper terminal of transformer secondary winding 17 are both connected to ground terminal 27. As a result, the voltages across capacitors 35 and 47 are of opposite phase to the voltage across tank unit 10 and the signals derived from the two capacitors tend to neutralize the signal derived from tank unit 10. As long as there is a signal appearing on the input terminals of amplifier 33 the motor 53 will operate in such a direction as to vary the voltage across capacitor 47 until the signal from capacitor 47 is equal in magnitude and opposite in phase to the variable portion of the signal from tank unit 10.

The circuit is calibrated as follows. With the tank empty wiper arm 22 is moved along rheostat resistor 21 causing the wiper arm 45 of potentiometer 43 to move along potentiometer resistor 44 until it is close to the zero potential point of potentiometer resistor 44. An indicator 55 has its needle 56 connected by a mechanical connection 57 to motor 53 and shows when wiper arm 45 is near the zero potential point of potentiometer resistor 44 by indicating almost zero on the indicator. When the indicator indicates almost zero the potentiometer wiper arm 25 is moved along potentiometer resistor 24 until the indicator reads exactly zero. At this time, the potentiometer wiper arm 45 is at the zero potential point on potentiometer resistor 44.

For full calibration the tank 11 is filled, causing energization of amplifier 33 and operation of motor 53 to move wiper arm 45 downwardly along potentiometer resistor 44 and also moving the needle 56 along indicator dial 55. When the tank has been filled the needle 56 of indicator 55 should be near the full mark. Wiper arm 42 is then moved along potentiometer resistor 41 until the indicator 55 reads exactly full.

The circuit as thus far shown and described is more fully shown and claimed in an application to Bancroft, Serial No. 181,747, filed August 28, 1950, now Patent No. 2,793,529 and assigned to the same assignee as the present invention.

The circuit as thus far shown has an indicator in which a needle moves over the face of the dial. However, in addition to this type of indicator or in place of this type of indicator it is becoming more and more desirable to have what is known as a digital type indicator. This is an indicator having separate indicator wheels for units, tens, hundreds, etc. pounds of fuel with only the numbers showing which indicate the actual number of pounds of fuel. A novel fast-acting digital indicator which will operate with the circuit thus far described will now be described.

A signal source in the form of a voltage from potentiometer wiper arm 45 is picked off wiper arm 45 and is impressed on the input circuits of three parallel connected discriminating threshold determining circuits 60, 60' and 60'' by conductor 61, isolating resistor 62 and conductors 63, 64 and 65.

Threshold circuit 60 is shown in detail and comprises a capacitor 66 to one electrode of which conductor 65 is connected. The other electrode of capacitor 66 is connected to a resistor 67, the other terminal of resistor 67 being connected by a conductor 70 to an input terminal of an amplifier 71. The connection between capacitor 66 and resistor 67 is connected to a wiper arm 72 of a potentiometer 73 having a resistor 74 which is connected across a battery 75. The lower terminals of potentiometer resistor 74 and battery 75 are connected to a ground terminal 76 by conductors 77 and 80. The connection between the lower terminals of potentiometer resistor 74 and battery 75 are also connected to ground terminal 81 by conductors 82 and 83. Actually, the lower terminals of the potentiometer resistor and battery could be connected to only one ground terminal but for the sake of clarity two input terminals and two output terminals are shown, one of the input terminals and one of the output terminals being grounded. The potentiometer wiper arm 72 is moved along potentiometer resistor 74 to oppose the voltage from potentiometer wiper arm 45 of potentiometer 43 so that a voltage of, for example, 0.025 volt minimum magnitude must be impressed on the input circuit of the threshold circuit 60 in order to have an output voltage of proper polarity to cause operation of amplifier 71. The second input terminal of amplifier 71 is connected to a ground terminal 84.

Threshold circuit 60' is connected to wiper arm 45 of potentiometer 43 by conductor 61, resistor 62 and conductors 63, 64 and 85. The other input terminal of threshold circuit 60' is connected to ground terminal 76 by a conductor 80. One of the output terminals of threshold circuit 60' is connected to an amplifier 71' by conductor 70'. The other output terminal of threshold circuit 60' is connected to ground terminal 81 by conductor 83. Threshold circuit 60'' is connected to potentiometer wiper arm 45 by conductor 61, resistor 62 and conductors 63 and 86. The other input terminal of threshold circuit 60'' is connected to ground terminal 76. One of the output terminals of threshold circuit 60'' is connected to an amplifier 71'' by conductor 70''. The other output terminal of threshold circuit 60'' is connected to ground terminal 81. Amplifiers 71' and 71'' have their second input terminals connected to ground terminals 84' and 84'' respectively.

A relay coil 87 of a relay 90 is connected to the output terminals of amplifier 71 which may be of the type shown and claimed in the Markusen Patent No. 2,626,324, assigned to the same assignee as the present invention.

Relay 90 has, in addition to relay coil 87, a fixed contact 91 and a movable contact 92. Energization of relay coil 87 causes movable contact 92 to make contact with fixed contact 91.

A relay 90' is connected to the output circuit of amplifier 71' while a relay 90'' is connected to the output circuit of amplifier 71''.

Relay contact 92 is connected to motor 93 by conductors 94 and 95 while fixed relay contact 91 is connected to motor 93 by conductor 96, battery 97 and conductor 100. Thus, when relay 90 is energized battery 97 is connected across motor 93 to cause rotation thereof.

This digital drive apparatus 101 is duplicated in the output circuits of relays 90' and 90'' and are indicated merely in box form as 101' and 101''. Motor 93 is connected by mechanical connections 102 and 103 to a potentiometer wiper arm 104 of a potentiometer 105 the wiper arm 104 moving across ten stepping contacts connected to potentiometer resistor 106.

In the same manner, the motor of the digital drive apparatus 101' is connected by mechanical connections 102' and 103' to a wiper arm 104' of a potentiometer 105' having a stepping resistor 106' and the motor of digital drive apparatus 101'' is connected by mechanical connections 102'' to wiper arm 104'' of a potentiometer 105'' having a stepping resistor 106''.

A first plurality of three potentiometers 105, 105' and 105'' are energized by a transformer 107 having a primary winding 110 connected to a source of power, not shown, and transformer secondary windings 111, 111' and 111''. The upper terminal of transformer secondary winding 111 is connected to one terminal of potentiometer stepping resistor 106 and also to a ground terminal 112. The lower terminal of transformer secondary winding 111 is connected to the opposite terminal of potentiometer resistor 106.

The wiper arm 104 of potentiometer 105 is connected by conductor 113 to the upper terminal of transformer secondary winding 111' and to one terminal of the potentiometer resistor 106'. The other terminal of transformer secondary winding 111' is connected to the opposite terminal of potentiometer resistor 106'. Wiper arm 104' is connected by conductor 114 to the upper terminal of transformer secondary winding 111'' and to one terminal of potentiometer resistor 106''. The other terminal of transformer secondary winding 111'' is connected to the opposite terminal of potentiometer resistor 106''. Wiper arm 104'' is connected by conductor 115, isolating resistor 116 and conductor 63 to the input circuits of the parallel threshold circuits 60, 60' and 60''. It is seen that the three potentiometers 105, 105' and 105'' are follow-up potentiometers with the voltages from the various potentiometers being added together in series and then fed back to the input circuits of the threshold circuits in opposition to the input signal voltage from potentiometer wiper arm 45.

Let it be assumed that the threshold voltage of threshold circuit 60 is 0.025 volt. This means that the input signal voltage from potentiometer wiper arm 45 must be of a magnitude of at least 0.025 volt in order to cause energization of amplifier 71. In a decimal system which is shown here, the threshold voltage of threshold circuit 60′ would be 0.25 volt while the threshold voltage for threshold circuit 60″ would be 2.5 volts. With a threshold voltage of 0.025 volt required to send a voltage through threshold circuit 60 a voltage of 0.25 volt must be impressed across potentiometer resistor 106 in order that a voltage difference of 0.025 volt be impressed between each of the contacts of potentiometer resistor 106 for feedback purposes. In the same manner the voltage across potentiometer resistor 106′ must be 2.5 volts while the voltage impressed across potentiometer resistor 106″ must be 25 volts.

Because the same voltage from potentiometer wiper arm 45 is impressed on each of the input circuits of the threshold circuit it is seen that the various threshold circuits operate simultaneously provided the input voltage is of a great enough magnitude. For example, if the input voltage from potentiometer wiper arm 45 should cause a signal of 0.875 volt to be at the threshold circuit 60″ amplifier 71″ would not be energized because the threshold voltage of threshold circuit 60″ is 2.5 volts. However, since the threshold voltage of threshold circuit 60′ is only 0.25 volt and the input voltage is 0.875 volt, threshold circuit 60′ would send a signal to amplifier 71′ to cause energization of relay 90′ and digital drive apparatus 101′ to move wiper arm 104′ along the stepping contacts of potentiometer resistor 106′ until the feedback voltage appearing at the threshold circuit 60′ from potentiometer 105′ would be 0.750 volt. At the same time that threshold circuit 60′ is operating, threshold circuit 60 would also be operating because the full input voltage of 0.875 volt would be impressed on the input circuit of threshold circuit 60. This would cause movement of wiper arm 104 along the stepping contacts of poteniometer resistor 106. By the time that potentiometer 105′ would have a feedback voltage of 0.75 volt, potentiometer 105 would have a feedback voltage of 0.075 volt. These two voltages are added together and result in a feedback voltage of 0.825 volt. There would still be an unbalance voltage on the input circuit of the threshold circuits of 0.050 volt, which would be insufficient to pass a signal through threshold circuit 60′. However, this difference voltage of 0.050 volt would be sufficient to cause continued energization of amplifier 71 and movement of wiper arm 104 along stepping contacts of potentiometer resistor 106 for two more contacts so that an additional feedback voltage of 0.050 volt would be added to the feedback voltage of 0.875 volt to completely balance out the signal voltage from potentiometer wiper arm 45.

As another example, assume that an unbalance voltage of 0.775 volt should appear on the input circuits of threshold circuits 60, 60′ and 60″. Here again both threshold circuits 60 and 60′ would pass signal voltages to amplifiers 71 and 71′ to cause movement of wiper arms 104 and 104′ across the next two contacts of potentiometer resistors 106 and 106′. This would result in an additional feedback, or rebalancing, voltage of 0.550 volt. This would result in a remaining unbalance voltage of 0.225 volt. This is insufficient to pass a signal through threshold circuit 60′. However, threshold circuit 60 would continue to pass voltage until the wiper arm 104 had passed completely around the stepping contacts of potentiometer resistor 106 and the feedback voltage from potentiometer 105 would be 0 volt. There would then be an unbalance voltage of 0.275 volt which would be sufficient to cause both threshold circuits 60 and 60′ to pass a signal and cause wiper arms 104 and 104′ to each move one additional contact along potentiometer resistors 106 and 106′ to obtain a final feedback voltage of 0.775 volt over the feedback voltage which existed before the unbalance voltage of 0.775 volt appeared on the input circuit of the threshold circuits which would completely balance out the voltage from wiper arm 45 of potentiometer 43.

It is necessary that the potentiometer wiper arms 104, 104′ and 104″ be moved from contact to contact and not stop midway between contact. For this reason motor 93, and similar motors in digital drive apparatus 101′ and 101″, drive toothed gears such as gear 117, which is driven by motor 93. Toothed gear 117 operates upon a switch 120 having a fixed contact 121 and a movable contact 122. The toothed gear causes intermittent contact between the contacts of switch 120 such that when the movable contact 122 moves over a tooth on gear 117 contact is made between the two switch contacts. When contact is made between the two switch contacts a circuit is completed to motor 93 from battery 97 as follows: from the upper, or fixed contact 121 through conductor 123, battery 97, conductor 100, motor 93 and conductors 95 and 124 to movable contact 122. It is thus seen that the switching contacts of switch 120 are in parallel with the relay contacts of relay 90. The toothed wheel 117 is so geared with respect to the wiper arm 104 of potentiometer 105 that when the wiper arm 104 is between the contacts fo resistor 106 the switching contacts 121 and 122 make connection to cause additional energization of motor 93 to move wiper arm 104 on to the next resistor contact. This additional energization of motor 93 is useful, of course, only when the relay coil 87 of relay 90 becomes deenergized and the wiper arm 104 is positioned between contacts of potentiometer resistor 106.

In the same manner toothed wheels and switches are included in the digital driving apparatus 101′ and 101″.

Motor 93 and digital drive apparatus 101, in addition to moving wiper arm 104 of potentiometer 105, is also connected by mechanical connections 102 and 125 to a wiper arm 126 of a transmitting potentiometer 127 which has a resistor 130 to which connection is made by means of ten stepping contacts. Wiper arm 126 is connected to a battery 131, the other terminal of which is connected to a wiper arm 132, the wiper arms 126 and 132 making contact with potentiometer resistor contacts at 180° apart. Wiper arm 126 in addition is connected to ground terminal 133.

Battery 131 provides energization of potentiometer 127 with the positioning of the wiper arms 126 and 132 determining the magnitude of the voltage along the resistor 130.

Potentiometer resistor 130 has three fixed output terminals 134, 135 and 136, each positioned at 120° from the others.

The motor in digital drive apparatus 101′ is connected in a similar manner to a potentiometer 127′ by mechanical connections 102′ and 125′ and the motor in digital drive apparatus 101″ is connected in a like manner to a transmitting potentiometer 127″ by mechanical connections 102″ and 125″. Transmitting potentiometers 127′ and 127″ are similar in construction to transmitting potentiometer 127 and comprise a second plurality of potentionmeters.

The comparative voltages on each of the three fixed contacts 134, 135 and 136 connected to potentiometer resistor 130 are determined by the positions of the wiper arms 126 and 132 on the stepping contacts of resistor 130. As a result, the comparative voltages on the three fixed contacts varies with movement of the wiper arms.

A receiver selsyn 137 has a coil 140 having three fixed connections 141, 142, and 143. Outside the coil 140 is a rotatable circular magnet 144 having two inwardly extending poles 145 and 146 180° apart. Fixed contact 141 on coil 140 is connected by conductor 147 to fixed contact 134 on transmitting potentiomter resistor 130 while contacts 142 and 143 on coil 140 are connected to contacts 135 and 136 on transmitting potentiometer resistor 130 by conductors 150 and 151 respectively. As a result, coil 140 is energized according to the comparative voltages on the three contacts 134, 135 and 136 of transmitting potentiometer resistor 130 to cause rotation of magnet 144 until the poles 145 and 146 are lined up in accordance to the voltage flux produced by the voltages at the different points along coil 140. At this time, the poles 145 and 146 of magnet 144 will be lined up with wiper arms 126, 132 of transmitting potentiometer 127.

In a like manner a receiver selsyn 137' is connected to transmitting potentiometer 127' and a receiver selsyn 137'' is connected to transmitting potentiometer 127''.

The outer surface of ring magnet 144 is divided into ten equal parts on which are placed the ten digits in the decimal system. In a like manner ten digits are placed on the outer surface of ring magnets 144' and 144''. The three receiver selsyns are lined up side by side and positioned behind a glass window, not shown, so that only one digit of each of the ring magnets appears through the window at a time. The three receiver selsyns 137, 137' and 137'' are all positioned so that the proper digit from each ring magnet appears through the window.

It has been previously explained how it is possible to operate more than one channel of the feedback circuit at a time and it is likewise apparent that more than one channel of the transmitter potentiometer and receiver selsyn channels may likewise be operated simultaneously. It is therefore possible to operate the various channels in the digital indicator independently of each other and thus obtain a much more rapid indication than would be possible were the tens channel to be connected to the units channel such that the tens channel would make only one-tenth of a revolution with a complete revolution of the units channel and likewise the hundreds channel make only a tenth of a revolution with a full revolution of the tens channel.

The designation of units, tens and hundreds channels have only been made for the purpose of simplification, it being realized that with large craft and large fuel tanks it might be possible that the units or units and tens channels be dispensed with, painted zeros being placed on the indicator for indicating the units and tens channels with the only operable channels being hundreds, thousands and ten thousands channels in order to indicate weight of fuel, for example, up to 99,900 lbs. Also, mention has been made of indicating the quantity of fuel in pounds rather than in gallons. It is desirable to measure fuel in pounds rather than in gallons because engines develop horsepower in accordance with the pounds of fuel used rather than gallons of fuel used and it has been found that with octane fuels any change in dielectric constant of the fuel due to change in temperature or different types of fuel is linear with change in density and that therefore the indicator may be calibrated in terms of pounds rather than in gallons. If fuels such as fuels for jet aircraft were used it would be desirable to use a compensator circuit for obtaining the signal indicative of the quantity of the fuel such as shown and described in the Franzel application Serial No. 200,258 filed December 11, 1950, and assigned to the same assignee as the present invention. There has been shown and described a high speed digital indicating apparatus in which the various digit wheels are not dependent upon each other for rotation.

While only a single embodiment of the invention has been shown and described, it is realized that modifications could be made by those skilled in the art within the spirit of this invention and therefore the scope of this invention is intended to be limited only to the extent of the appended claims.

We claim as our invention:

1. Indicating apparatus comprising in combination: a signal source; a plurality of signal discriminating means connected to said signal source; a plurality of impedances, the signals from said impedances being of opposite direction to the signal from said source; rebalance means adding the signals from said plurality of impedances and impressing the resultant signal on the input circuits of said plurality of discriminating means such that it opposes the signal from said sources; each of said signal discriminating means being responsive to a different magnitude of the resultant signal regardless of direction; unidirectional actuating means connected to and continuously responsive to each of said signal discriminating means for unidirectionally varying the output signals of each of said impedances from one extreme of their magnitude to the other extreme and thereupon repeating the cycle; said actuating means being operative to cause the differential between said resultant signal and the signal from said source to be reduced to a value at which said actuating means becomes inoperative; and a plurality of digital indicator means for digitally indicating the magnitudes of the signal from said source, said indicator means being operatively connected to and unidirectionally driven by said actuating means so that the magnitude of the digits goes from one extreme value to the other extreme and thereupon repeating the cycle.

2. Indicating apparatus comprising in combination: a source of alternating voltage signal; a plurality of voltage magnitude discriminating means connected in parallel to said source; a plurality of impedances each having a plurality of contacts arranged in a substantially closed line, each impedance being connected across an alternating voltage source of opposite phase to the alternating voltage signal, the alternating voltage output signals from said impedances being of opposite phase to the alternating voltage signal from said source; rebalance means adding the alternating voltage signals from said plurality of impedances and impressing the resultant alternating voltage signal on the input circuits of said plurality of discriminating means such that the resultant signal opposes the signal from said source; each of said discriminating means being responsive to a different magnitude of the resultant signal regardless of phase; unidirectional actuating means connected to and continuously responsive to each of said voltage magnitude discriminating means for causing the appropriate one of the contacts of each of said impedances to be engaged to thereby vary the alternating voltage output signals from said impedances so that the differential between said resultant signal and the signal from said source is reduced to a value at which said actuating means becomes inoperative; and a plurality of digital indicator means for digitally indicating the magnitude of the alternating voltage signal from said source, said indicator means being operatively connected to and unidirectionally driven by said actuating means and having the digits arranged in a substantially closed line.

3. Indicating apparatus comprising in combination: a source of alternating voltage signal; a plurality of voltage magnitude discriminating means connected in parallel to said source; a plurality of potentiometers each having ten voltage steps arranged in a substantially closed line, each potentiometer being energized by a source of alternating voltage of opposite phase to the alternating voltage signal, the alternating voltage output signals from said potentiometers being of opposite phase to the alternating voltage signal from said source; rebalance means adding the alternating voltage signals from said plurality of potentiometers and impressing the resultant alternating voltage signal on the input circuits of said plurality of discriminating means such that the resultant signal opposes the signal from said source; each succeeding discriminating means being responsive to a magnitude of the resultant alternating voltage signal ten times as large as the preceding discriminating means regardless of phase; unidirectional actuating means connected to and continuously responsive to each of said voltage magnitude discriminating means for causing the appropriate one of the voltage steps of each of said potentiometers to be engaged to thereby vary the alternating voltage output signals from said potentiometers so that the differential between said resultant signal and the signal from said source is reduced to a value at which said actuating means becomes inoperative; and a plurality of digital indicator means for digitally indicating the magnitude of the alternating voltage signal from said source, said indicator means being operatively connected to and unidirectionally driven by said actuating means and having the digits arranged in a substantially closed line.

4. Apparatus for digitally indicating the quantity of a substance in a container comprising in combination: impedance means inserted in a container of a substance such that the impedance of the impedance means varies with change in quantity of the substance; signal deriving means connected to said impedance means for deriving a signal dependent in magnitude on the quantity of the substance in the container; a plurality of signal discriminating means connected to said signal deriving means; a plurality of impedances, the signals from said impedances being of opposite direction to the signal from said signal deriving means; rebalance means adding the signals from said plurality of impedances and impressing the resultant signal on the input circuits of said plurality of discriminating means such that it opposes the signal from said signal deriving means; each of said signal discriminating means being responsive to a different magnitude of the resultant signal regardless of direction; unidirectional actuating means connected to and continuously responsive to each of said signal discriminating means for unidirectionally varying the output signals of each of said impedances from one extreme of their magnitude to the other extreme and thereupon repeating the cycle, said actuating means being operative to cause the differential between said resultant signal and the signal from said signal deriving means to be reduced to a value at which said actuating means becomes inoperative; and a plurality of digital indicator means for digitally indicating the quantity of the substance in the container, said indicator means being operatively connected to and unidirectionally driven by said actuating means so that the magnitude of the digits goes from one extreme value to the other extreme and thereupon repeating the cycle.

5. Apparatus for digitally indicating the quantity of a substance in a container comprising in combination: impedance means inserted in a container of a substance such that the impedance of the impedance means varies with change in quanity of the substance; signal deriving means connected to said impedance means for deriving an alternating voltage signal dependent in magnitude on the quantity of the substance in the container; a plurality of voltage magnitude discriminating means connected in parallel to said signal deriving means; unidirectional actuating means connected to and continuously responsive to each of said voltage magnitude discriminating means; a plurality of potentiometers each having ten voltage steps arranged in a substantially closed line and an adjustable wiper, each potentiometer being energized by a source of alternating voltage of opposite phase to the alternating voltage signal, each of said wipers being unidirectionally controlled by said actuating means for varying the alternating voltage output signals from said potentiometers, the alternating voltage output signals from said potentiometers being of opposite phase to the alternating voltage signal from said signal deriving means; rebalance means adding the alternating voltage signals from said plurality of potentiometers and impressing the resultant alternating voltage signal on the input circuits of said plurality of discriminating means such that the resultant signal opposes the signal from said signal deriving means; each succeeding discriminating means being responsive to a magnitude of the resulting signal ten times as large as the preceding discriminating means regardless of phase; said actuating means being operative to cause the differential between said resultant signal and the signal from said signal deriving means to be reduced to a value at which said actuating means becomes inoperative; and a plurality of digital indicator means for digitally indicating the quantity of the substance in the container, said indicator means being operatively connected to and unidirectionally driven by said actuating means and having the digits arranged in a substantially closed line.

6. Indicating apparatus comprising in combination: a source of alternating voltage signal; a plurality of voltage magnitude discriminating means connected in parallel to said source; a plurality of potentiometers each having ten voltage steps arranged in a substantially closed line, each potentiometer being energized by a source of alternating voltage of opposite phase to the alternating voltage signal, the alternating voltage output signals from said potentiometers being of opposite phase to the alternating voltage signal from said source; rebalance means adding the alternating voltage signals from said plurality of potentiometers and impressing the resultant alternating voltage signal on the input circuits of said plurality of discriminating means such that the resultant signal opposes the signal from said source; each succeeding discriminating means being responsive to a magnitude of the resulting signal ten times as large as the preceding discriminating means regardless of phase; unidirectional actuating means connected to and continuously responsive to each of said voltage magnitude discriminating means for causing the appropriate one of the steps of each of said potentiometers to be engaged to thereby vary the alternating voltage output signals from said potentiometers so that the differential between said resultant signal and the signal from said source is reduced to a value at which said actuating means becomes inoperative; and a plurality of indicator means for indicating the magnitude of the alternating voltage signal from said source, said indicator means being operatively connected to and unidirectionally driven by said actuating means and having the indicia arranged in a substantially closed line.

References Cited in the file of this patent

UNITED STATES PATENTS

| | | |
|---|---|---|
| 2,197,636 | Faus | Apr. 16, 1940 |
| 2,621,518 | Sontheimer | Dec. 16, 1952 |
| 2,625,822 | Nichols | Jan. 20, 1953 |